No. 655,138. Patented July 31, 1900.
H. WELCH.
LUMBER TRUCK.
(Application filed Feb. 3, 1900.)
(No Model.)
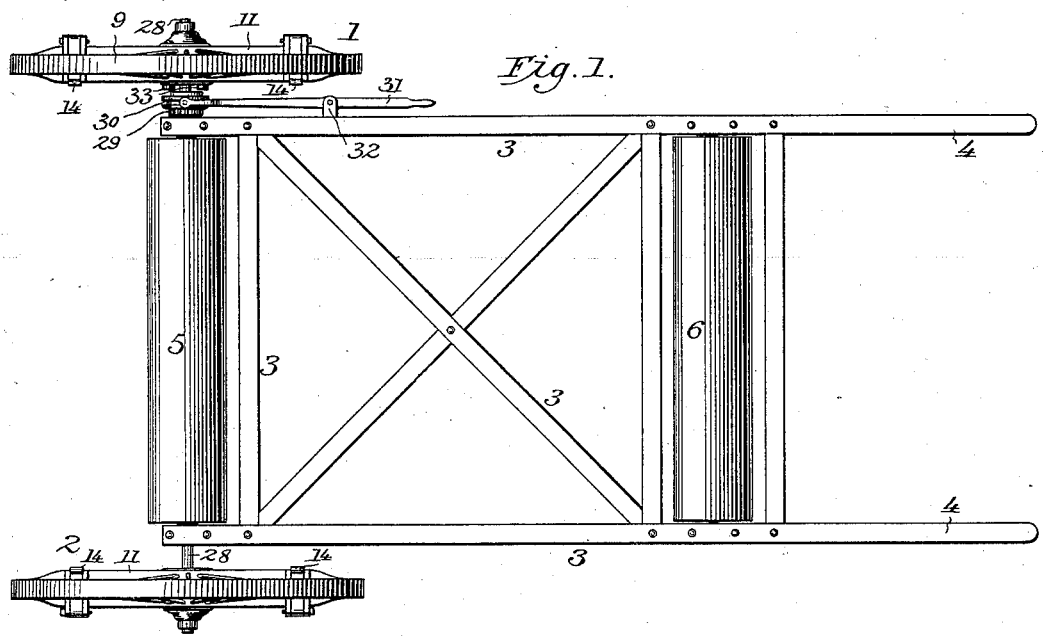
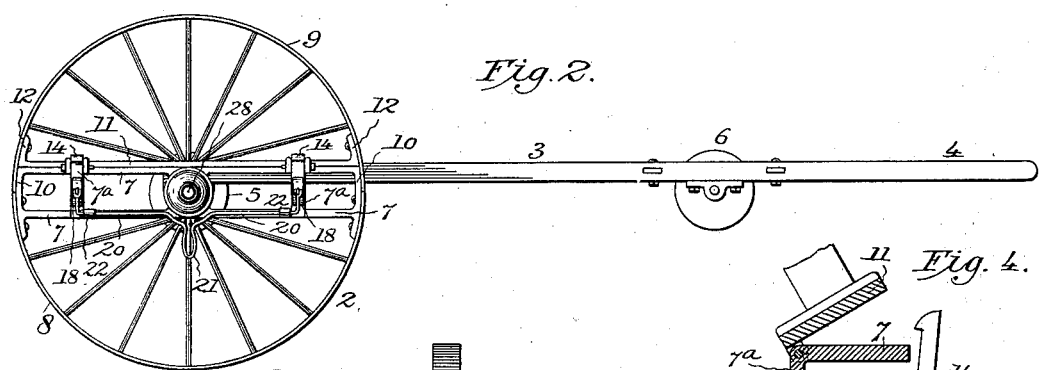
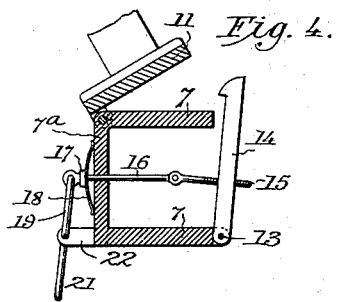
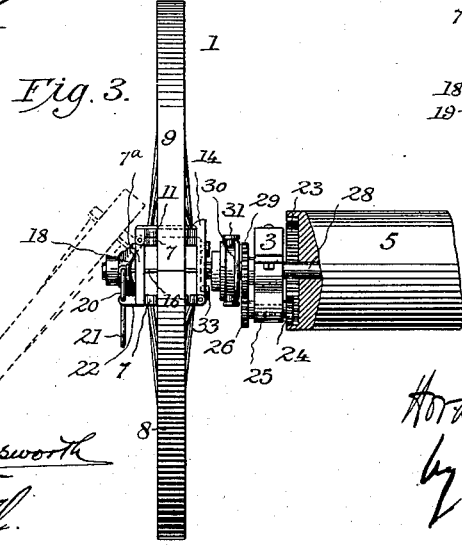
Witnesses
Sidney P. Hollingsworth
C. B. Bull
Inventor
Horace Welch,
by his Attorneys

UNITED STATES PATENT OFFICE.

HORACE WELCH, OF SELMA, ALABAMA.

LUMBER-TRUCK.

SPECIFICATION forming part of Letters Patent No. 655,138, dated July 31, 1900.

Application filed February 3, 1900. Serial No. 3,848. (No model.)

*To all whom it may concern:*

Be it known that I, HORACE WELCH, a citizen of the United States, residing at Selma, in the county of Dallas and State of Alabama, have invented certain new and useful Improvements in Lumber-Trucks, of which the following is a specification, reference being had to the accompanying drawings, and to the numerals of reference marked thereon.

My invention relates to a truck, the use of which facilitates the loading and unloading of the lumber; and it consists in certain details and combinations hereinafter more particularly described, and pointed out in the claims.

In the accompanying drawings, Figure 1 is a plan view of my improved lumber-truck. Fig. 2 is a side elevation. Fig. 3 is an end elevation of one of the wheels and parts connected therewith, the same being shown partly in section on an enlarged scale. Fig. 4 is an enlarged view, partly in section, of a detail hereinafter described.

Similar numerals of reference indicate similar parts in the several figures.

Referring to the drawings, 1 and 2 are the truck-wheels, which have the particular construction hereinafter described.

3 3 3 indicate the frame of the truck, and 4 its handles.

5 represents a roller at the rear end of the truck-frame, and 6 a similar roller near the forward end.

Referring to the truck-wheels 1 and 2, they are constructed in such a manner that the upper half of each wheel may be turned over, so that the lumber may be conveniently loaded to and unloaded from the truck. In Fig. 3 is shown in dotted lines the upper half of the wheel in the act of being turned down. The construction of each of the truck-wheels 1 and 2 and the means for releasing the upper half from the lower and turning down the upper half are as follows:

By reference more particularly to Fig. 2 it will be seen that the lower half of the wheel is provided with a metallic brace 7, which is riveted or otherwise secured to the lower section of the tire 8 of the wheel. The brace 7 extends somewhat above the central or division line of the wheel, as shown at 10, so that the ends of the upper half 9 of the tire lap over the brace 7, as clearly seen in Fig. 2.

The upper half or segment 9 of the tire is provided with a brace 11, having at each end a flange 12, riveted or otherwise secured to the tire, as shown. The braces 7 and 11, as will be seen, add to the strength of the respective segments of the wheel, taking the place of but having greater strength and bracing capacity than the ordinary spokes. Secured to the brace 7 or forming parts thereof are two bridge-pieces 7ª, (see especially Figs. 2 and 4,) and at the upper corner at which the bridges 7ª unite with the upper horizontal portion of the brace 7 the upper half of the wheel is hinged, the hinging being between the said upper part of the brace 7 and the brace 11 of the upper half of the wheel. Behind each of the bridges 7ª and hinged, as shown more particularly in Fig. 4 at 13, is a latch 14, united by a threaded connection 15 with a rod 16. The rod 16 is provided with a shoulder 17, between which and the face of the bridge 7ª is a plate-spring 18, which normally forces the rod 16 outwardly. When the wheel is in its normal condition—that is to say, when the two segments are united so as to form a complete wheel—the latches 14 fit over the top of the brace 11, holding the braces 7 and 11 together. To the outer end of each rod 16 is connected a rod 19, the two rods being joined by means of a connection 20, which is bent at the center of the wheel so as to form a handle 21. The connection 20 is supported by lugs 22, integral with the lower section of the brace 7. It will be seen that by pulling out the handle 21 the latches 14 will be thrown from contact with the brace 11 against the force of the spring 18 and that the upper half of the wheel will be released, so that it may be turned over, as shown in Fig. 3, thus allowing the lumber to be evenly loaded or unloaded from the truck, and the necessity of lifting the lumber or logs over the wheel is thus obviated, greatly economizing in time and saving labor.

In order to automatically unload the lumber from the truck, the rear roller 5, by means of a clutch device, may be made to revolve in a direction opposite to that in which the truck is being moved. The roller 5 is provided with internal gearing 23, which engages with a pinion 24 upon one end of a shaft 25, upon the opposite end of which is a pinion 26.

The axle 28 is provided with a gear 29, fixed or loose thereon, which engages with the pinion 26. A clutch 30 is adapted to slide laterally on the hub of the gear 29 by means of a bar 31, pivoted to the frame at 32, a feather or key connecting the clutch member to the hub in the usual manner. The hub of the wheel 1 is provided with lugs 33, with which the clutch 30 may be made to engage, causing the gear 29 to revolve the pinion 26, which in turn, through the medium of the pinion 24 and the internal gearing 23, produces a revolution of the roller 5 in a direction opposite to that in which the truck is being moved. The lumber resting upon the forward roller 5 and the rear roller 6 is automatically unloaded from the truck as the latter is moved.

It will thus be seen that my invention not only by reason of the construction of the wheels permits the convenient loading and unloading of the lumber, but also provides for the automatic discharge of the lumber from the truck. It is obvious that either of the wheels 1 or 2, or both of them, may be constructed in the manner herein described.

It is obvious that my invention admits of changes in construction and detail such as would readily suggest themselves to a skilled mechanic without the exercise of invention. Therefore I do not confine myself to the precise construction and combinations herein described, whether such refer to the construction of the wheel whereby a segment thereof may be turned over to facilitate the loading or unloading of the truck, to the means for holding the segments of the wheel together and releasing said segments, or to the means whereby the roller 5 may be put in clutch, so as to cause it to revolve in a direction opposite to that in which the truck is moved.

My invention is intended to cover not only the preferred constructions herein shown, but also such minor changes in combination and detail as would without the exercise of invention suggest themselves to the skilled mechanic.

Having thus described my invention, I claim—

1. In a lumber-truck, the combination of a frame, an axle and wheels mounted thereon, said wheels capable of being folded down at a line at or near the center of the wheel, substantially as set forth.

2. In a lumber-truck, the combination of a frame, an axle, wheels adapted to be folded at a division-line as specified, and rollers mounted in the frame, substantially as set forth.

3. In a lumber-truck, the combination of a frame, an axle, a pair of wheels mounted thereon, one or both of which are capable of being folded down at or near the center line thereof, and means for locking the divided sections of said wheel or wheels together, substantially as set forth.

4. In a lumber-truck, the combination of a frame, an axle, a pair of wheels mounted thereon, one or both of which are capable of being folded down at or near the center line thereof, means for locking the divided sections of said wheel or wheels together, and means for releasing the respective segments of the wheel or wheels, substantially as set forth.

5. In a lumber-truck, the combination of a frame, an axle, wheels mounted on the axle, the hub of one wheel being provided with lugs, a roller loosely mounted upon said axle, and means whereby the said roller may be thrown into clutch with the said wheel so as to cause the roller to revolve in a direction opposite to that in which the truck is moved, substantially as set forth.

In testimony whereof I hereunto set my hand.

HORACE WELCH.

Witnesses:
S. C. STUTTS,
F. A. DE BARDELEBEN.